Sept. 2, 1969 T. H. HACKLEY ET AL 3,465,360
ELECTROGRAPHIC PLURAL CHANNEL RECORDER EMPLOYING ANALOG-TO-DIGITAL CONVERTER MEANS AND MULTIPLEXED BINARY DATA OUTPUTS
Filed Aug. 21, 1967
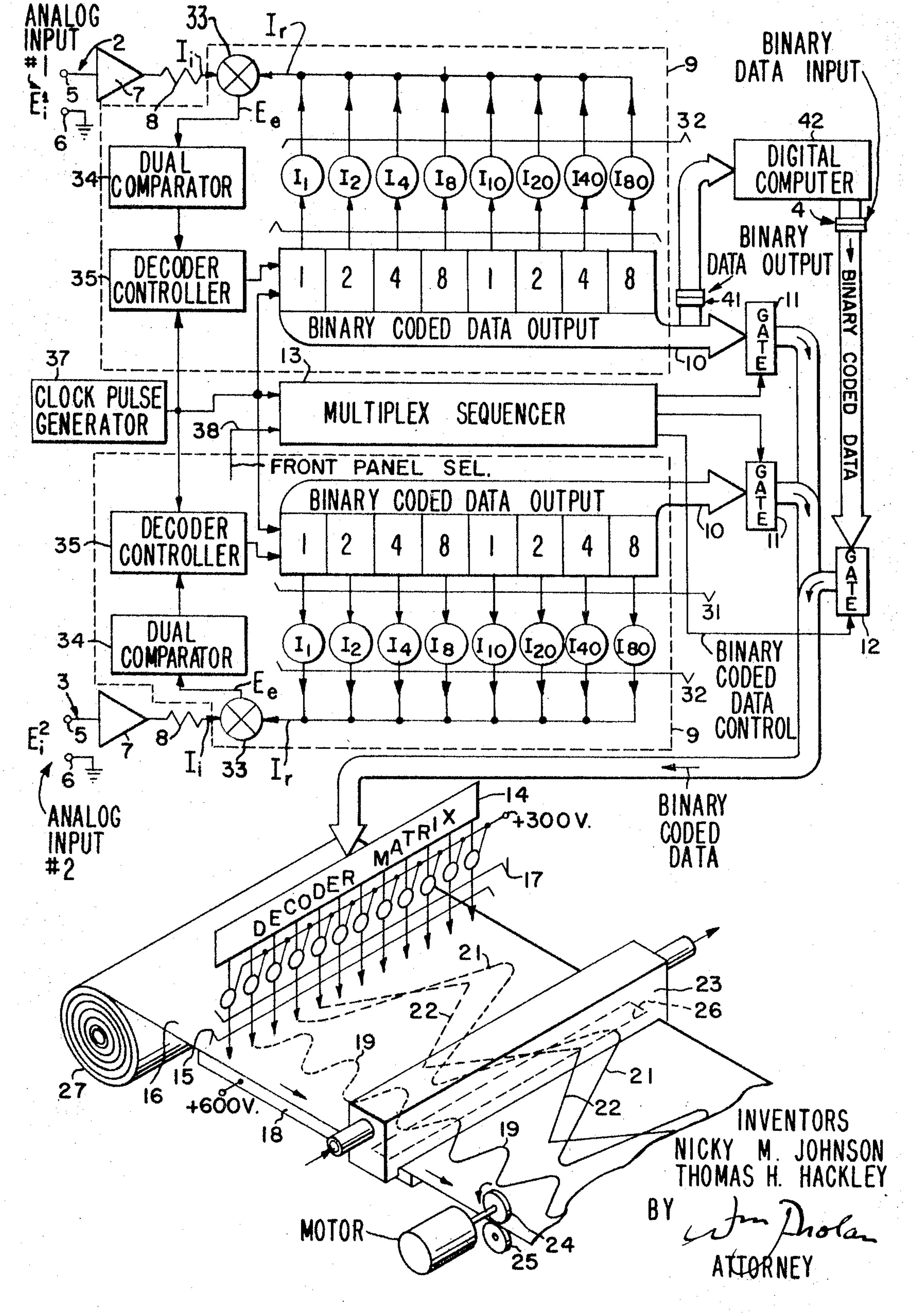
INVENTORS
NICKY M. JOHNSON
THOMAS H. HACKLEY
BY [signature]
ATTORNEY 3,465,360

ELECTROGRAPHIC PLURAL CHANNEL RECORDER EMPLOYING ANALOG-TO-DIGITAL CONVERTER MEANS AND MULTIPLEXED BINARY DATA OUTPUTS

Thomas H. Hackley, Mountain View, and Nicky M. Johnson, San Carlos, Calif., assignors to Varian Associates, Palo Alto, Calif., a corporation of California Filed Aug. 21, 1967, Ser. No. 662,103
Int. Cl. G01d *9/00, 15/06*
U.S. Cl. 346—34 6 Claims

ABSTRACT OF THE DISCLOSURE

A plural channel electrographic recorder is disclosed employing an analog-to-digital converter in at least one of the input channels for converting the analog input signal to binary data. The binary data output of a second channel of the recorder is multiplexed with the binary data output of the first channel to selectively energize writing electrodes of an array of writing electrodes disposed over an electrographic recording medium to produce substantially simultaneous recording of the inputs supplied to the first and second channels. The second channel may receive either analog or binary input signals and additional binary and/or analog input channels may be provided.

In a preferred embodiment, the first and second binary data outputs are coded and the coded outputs are multiplexed to a decoder matrix. The output of the decoder matrix energizes the proper writing electrode to reproduce the input signals.

In another embodiment of the present invention, a sample of the binary data output of the first analog input channel is obtained and fed to a digital computer for processing. The processed binary data signal is returned to the recorder and applied to a second input channel of the recorder for multiplexing and recording with the output data from the first channel.

In this manner a simultaneous recording is obtained of the original analog input signal and of the computer processed version of the original signal.

In another embodiment of the present invention, a clock pulse generator is employed having a sample of its output applied to the analog-to-digital converter for controlling the tracking rate thereof and a second sample of its output applied to the multiplexer to provide means for correlating the operation of the multiplexer with the tracking rate of the analog-to-digital converter.

Description of the prior art

Heretofore, plural channel electrographic recorders have been proposed wherein the analog input signals have been multiplexed prior to their conversion to digital (binary) form. Such a recorder is described and claimed in copending U.S. application, 582,767 filed Sept. 28, 1966, now Patent No. 3,394,383, and assigned to the same assignee as the present invention. One of the problems associated with multiplexing the analog input signals is that the tracking analog-to-digital converter must slew over relatively large differences in signal level between successive valid data points of different signals to be recorded. As a result, the recorded output signals for plural channels are obtained at longer intervals of time. In addition, such an arrangement does not readily lend itself to the simultaneous recording of analog signals and binary data signals as may be obtained, for example, from the output of a digital computer arranged for processing one of the input signals. Therefore, it is desirable to obtain a multiplexed plural channel electrographic recorder apparatus which will record more valid data points per unit of time and which is also capable of substantially simultaneous recording of analog data and binary data.

Summary of the present invention

The principal object of the present invention is the provision of an improved plural channel electrographic recorder apparatus.

One feature of the present invention is the provision, in a plural channel electrographic recorder apparatus employing at least one tracking analog-to-digital converter producing binary data output representative of a tracked analog input signal to be recorded, of a multiplexer for multiplexing plural binary data output signals representative of the plural input signals to be recorded, whereby the recorded signals may have a greater number of valid data points per unit time to produce recordings of a more continuous characteristic.

Another feature of the present invention is the same as the preceding feature wherein one of the input channels is adapted to receive binary data to be multiplexed with the binary data output of another channel of the recorder, whereby binary data input signals may be essentially simultaneously recorded with analog data input signals.

Another feature of the present invention is the same as any one or more of the preceding features wherein the recorder includes a second analog input channel with a second tracking analog-to-digital converter producing binary data representative of a second analog signal to be recorded, and wherein the binary data outputs of the two analog input channels are multiplexed to produce essentially a simultaneous recording of the two analog input signals.

Another feature of the present invention is the same as any one or more of the preceding features wherein the recorder includes a clock pulse generator producing a train of clock pulses and wherein the multiplexer means and the analog-to-digital tracking converter means have their operations correlated by the clock pulses.

Another feature of the present invention is the same as any one or more of the preceding features wherein the recorder includes an output terminal for extracting a sample of the binary data output of the first analog input channel and including digital computer means operative upon the binary data for processing same to derive a processed binary output signal, and including means for feeding the processed binary output signal to another input channel of the recorder to be multiplexed and recorded with the signal applied to the first analog input channel, whereby the original analog input signal and its processed signal may be simultaneously recorded.

Other features and advantages of the present invention will become apparent upon a perusal of the following specification taken in connection with the accompanying drawings wherein:

Brief description of the drawings

The drawing is a schematic circuit diagram, partly in block diagram form, of an electrographic recorder employing features of the present invention.

Description of the preferred embodiments

Referring now to the drawing there is shown an electrographic recorder applying features of the present invention. The recorder 1 includes at least three input channels, a first and second analog input channels 2 and 3, respectively, and a binary data input channel 4. The two analog input channels 2 and 3 are essentially indentical and each includes a pair of input terminals 5 and 6 across which a pair of analog input signals $E_i^1$ and $E_i^2$ are applied to be recorded. The input signals are amplified in a preamplifier 7 and converted in the output of the preamplifier 7 via resistor 8 to input currents $I_i$ representative of the input voltage to be measured. The input currents $I_i$ are fed to tracking analog-to-digital converters 9 wherein the input signal is converted to binary coded data appearing at output 10 and fed to a gate 11. Binary data to be recorded is supplied to the binary input 4 and thence fed to gate 12. The binary data is carried on multi-conductor cables.

A multiplex sequencer 13 supplies outputs to gates 11 and 12 for sequentially gating the binary outputs 10 and the binary output data from input 4 to a decoder matrix 14 in a time sharing manner. The decoder matrix 14 decodes the binary data and selectively energizes the proper electrode of an array of writing electrodes 15 extending across and disposed over an electrographic recording web 16 for sequentially recording the signals to be recorded on the recording web 16.

An array of gating transistors 17 are series connected between the decoder 14 and the writing electrodes 15 for selectively gating to ground a relatively high potential as of plus 300 volts applied to the writing electrodes 15 via gate transistors 17. More particularly, the output signals from the decoder matrix 14 are typically on the order of a few volts, whereas the writing potential required for the electrodes 15 is typically on the order of −500 volts. This writing potential is established between the electrodes 15 and a second plate shaped writing electrode 18 disposed on the opposite side of a recording web 16 from the writing electrodes 15 and operated at a relatively high positive potential as of plus 600 volts. The potential as of plus 300 volts applied to the writing electrodes via gating transistors 17 produces a writing potential between the electrodes 15 and the plate electrode 18 of only plus 300 volts. This is insufficient to produce writing on the recording web 16 since a minus 500 volts is typically required for the writing electrode potential relative to the plate electrode 18. Thus, the selected output from the decoding matrix 14 selectively energizes a selected writing electrode 15 by biasing one of the transistors 17 to a conducting state causing the selected transistor 17 to ground the selected writing electrode, thereby producing a minus 600 volts on the selected writing electrode 15 relative to the writing plate 18 thereby depositing a charge image on the charge retentive surface of the recording web 16.

Although the outputs of the three channels to be recorded are sequentially applied to the writing electrodes 15 the time delay between sequential signals laid down upon the recording web is on the order of a few microseconds such that for practical purposes the three channels are simultaneously recorded. The three charge images are identified as 19, 21 and 22 on the recording web 16 and the web is pulled past a hollow inking channel 23 by a motor driven drive wheel 24 which grips the recording web 16 between the drive wheel 24 and an idler wheel 25.

The inking channel 23 includes an inking slot 26 permitting fluid communication between the electrographic toner in the inking channel 23 and the charge images 19, 22 and 21 to be inked. As the charge images come in fluid communication with the toner, the charged pigment particles are pulled from the toner to the charge images for developing same. The developed charge images appear on the web 16 after the web has passed under the inking channel 23.

A suitable recording web 16 is electrographic recording paper marketed by Crown Zellerbach and Plastic Coating Corporation and comprises a conductive paper backing with a dielectric film forming a charge retentive surface. The conductive paper backing is disposed adjacent the writing electrode plate 18 and the charge retentive surface is disposed adjacent the writing electrodes 15. The electrographic toner, in a preferred embodiment, comprises a liquid toner having pigment particles colloidally suspended in a dielectric liquid. The recording web is pulled past the writing electrodes 15 from a supply roll 27.

Each of the tracking analog-to-digital converters 9 include a dual decade counter circuit 31 for counting to 100 since there are 100 writing electrodes 15. The counter circuit 31 includes two outputs. One output goes to an array of current generators 32 for producing a total current output having an amplitude corresponding to the count of the counter circuit 31. The current output serves as a feedback reference signal $I_r$ fed to one input of an error detector 33 wherein it is compared with the input current $I_i$ to be measured to produce an output error voltage $E_e$ which is employed to control the counter such that the counter tracks the input signal $E_i$ to produce a null balance therewith. The other output of the counter circuit 31 is a binary coded signal forming the binary data output 10.

The error signal $E_e$ is fed to a dual comparator 34 which produces a binary coded output which is fed to a decoder controller 35 and, thence, to the counter circuit 31 for causing the counter to count up or down or not to count at all depending upon the polarity and magnitude of the error signal $E_e$. More particularly, the dual comparator includes two reference voltage levels defining the edges of a dead zone for the recorder. When the error signal $E_e$ falls within the dead zone voltage having a width corresponding to the least significant bit to be recorded by the recording electrodes 15, i.e., the signal voltage difference represented by adjacent electrodes 15, the output of the dual comparator is a coded signal telling the counter not to count. If the error signal $E_e$ falls to the high side of the dead zone the dual comparator 34 issues an "up count" signal to the counter 31, whereas if the error voltage $E_e$ is lower than the lower level of the dead zone the dual comparator 34 issues a "down count" to the counter 31.

A clock pulse generator 37 generates a train of clock pulses at a suitable high rate as of 1 megacycle. The clock pulses are applied to the counter circuits 31 to establish the rate at which the analog-to-digital converter 9 will track the input signal $I_i$. More particularly, on each pulse of the output train of the clock pulse generator the counter circuit 31 makes one count up or down or does not count at all depending upon the output of the dual comparator 34 and decoder 35.

The clock pulses are also applied to the decoder controller 35 such that the command output from the decoder 35 does not change during the time that the counter circuit 31 is responding to the controller output of the decoder 35. In other words, the command output from the decoder 35 is already in the counter circuit 31 when the clock pulse which causes the counter to count is applied to the counter circuit 31. Also the clock pulse generator 37 sends clock pulses to the multiplex sequencer 13 to correlate the operation of the gates 11 with the count cycle in the counter circuit 31.

A front panel adjustment 38 supplies an input to the multiplex sequencer 13 such that the sequencer can select any one, any two, or all three of the binary data outputs from the three channels of the recorder. The front panel adjustment 38 may be set into the multiplex sequencer 13 such that only one channel is being recorded, in which case an output is recorded from that channel for each clock pulse generated by the clock pulse generator 37. Alternatively, the front panel adjustment 38 may be set into the multiplex sequencer 13 such that two channels are recorded in which case the multiplex sequencer 13 alternately sequentially gates the outputs from the two channels being recorded. As a third alternative, the front panel adjustment 38 may be set to record all three data channels, in which case each channel is recorded on every third pulse of the clock pulse generator output.

Although the recorder 1 has been described as it would be employed with two analog input channels and one binary data input channel the recorder may employ a greater number of both types of channels or a lesser number of both types of channels. However, the operation would be essentially the same as that described for the three channels.

A binary data output terminal 41 is provided for sampling the binary coded output of one of the analog input channels. A digital computer 42 may be connected to the binary data output terminal 41 for processing the binary data and for producing a processed binary data output which may be connected to the binary data input terminal 4 for essentially simultaneous recording with the unprocessed binary data output coresponding to one of the analog input signals. This feature is especially desirable in certain applications where it is desired to have a recording corresponding to the original analog signal and to present simultaneously therewith a processed signal such as, for example, the integral of the first signal or the first signal after some function has been performed on the signal such as smoothing or the like.

One of the advantages in multiplexing the binary data rather than multiplexing the analog data is that the tracking analog-to-digital converter 9 may continuously track the analog signal such that it does not have to count over relatively long counting intervals between signals having substantially different amplitudes, such that a larger number of valid data points may be sequentially plotted or recorded provided the counter circuit 31 counts at a sufficient rate to faithfully track the analog input signal. This results in a more continuous recording trace of the analog input signals than would be obtained if the analog input signals were multiplexed into the input of the analog-to-digital converter 9. Multiplexing the binary coded data also facilitates multiplexing of an input channel which receives input binary data. In a preferred embodiment, the code utilized in the output of the counter circuit 31 is a binary decimal code which is compatible with the binary codes employed in most digital computers 42. This facilitates utilization of the binary coded data as an input to a digital computer for processing one of the signals to be recorded and to permit the output of the digital computer to be fed into the binary data input channel for simultaneous recording, as previously described.

Although the recorder of the present invention has been described employing electrographic recording paper which receives a charge image which is subsequently developed by an electrographic toner, such a recording process is not required and it would be possible to use an electrosensitive recording web 16 which has an electro-sensitive coating or material imbedded therein which is exposed or discolored by the passing of an electrical current from the selected writing electrode 15 through or into the recording web 16. In such a case, the electrographic toner channel 23 would not be required. Also it is possible that the counter circuits 31 could comprise shift registers or ring counters having a binary data output which was not coded such that it could be fed via gates 11 directly to the writing electrode array 15 via the array of gating transistors 17. However, such a counter circuit requires a greater number of counting elements (binaries) than that employed by the decade counters 31 which produce the binary coded data output.

What is claimed is:

1. In an electrographic plural channel recorder apparatus, means forming first and second input channels to which signals may be applied to be recorded, means forming an array of electrographic writing electrodes arranged to be disposed over a recording medium, analog-to-digital converter means connected into said first input channel to convert an analog input signal into a binary data signal representative of the analog input signal to be recorded, the improvement comprising, means for receiving and operating upon binary data signals for multiplexing binary data outputs of said first and second input channels to common ones of the writing electrodes of said array of writing electrodes for recording the signals from said first and second input channels on a common recording medium.

2. The apparatus of claim 1 wherein said second input channel includes, analog-to-digital converter means to produce a second binary data output which continuously tracks the analog input signal applied to said second input channel.

3. The apparatus of claim 1 wherein said multiplexing means includes, means for sequentially gating the binary outputs from said first and second input channels to said array of writing electrodes in a time sharing manner.

4. The apparatus of claim 1 wherein the first and second binary data outputs are coded, and means for decoding the binary coded outputs of said first and second channels for energizing the proper writing electrode of said array of electrodes, and said multiplexer means including, means for sequentially gating the binary coded outputs of said first and second channels to said decoder means.

5. The apparatus of claim 1 including, means forming a clock pulse generator for generating a train of clock pulses to control the tracking rate of said analog-to-digital converter means, and wherein said multiplexer means includes, means for correlating the gating of the binary coded outputs with the clock pulse output of said clock pulse generator means.

6. The apparatus of claim 1 including, means forming an output terminal for extracting a sample of the binary data output of said first input channel, means for processing said binary data to derive a processed binary output signal, and means for feeding said processed binary output signal to said second input channel for recording thereof.

References Cited

UNITED STATES PATENTS

| | | | |
|---|---|---|---|
| 2,708,615 | 5/1955 | Greenleaf et al. | 346—33 |
| 2,847,268 | 8/1958 | Cowper | 346—14 |
| 2,933,364 | 4/1960 | Campbell | 346—34 X |
| 3,394,383 | 7/1968 | Lloyd | 346—32 |

RICHARD B. WILKINSON, Primary Examiner
JOSEPH W. HARTARY, Assistant Examiner

U.S. Cl. X.R.

346—35, 74